UNITED STATES PATENT OFFICE.

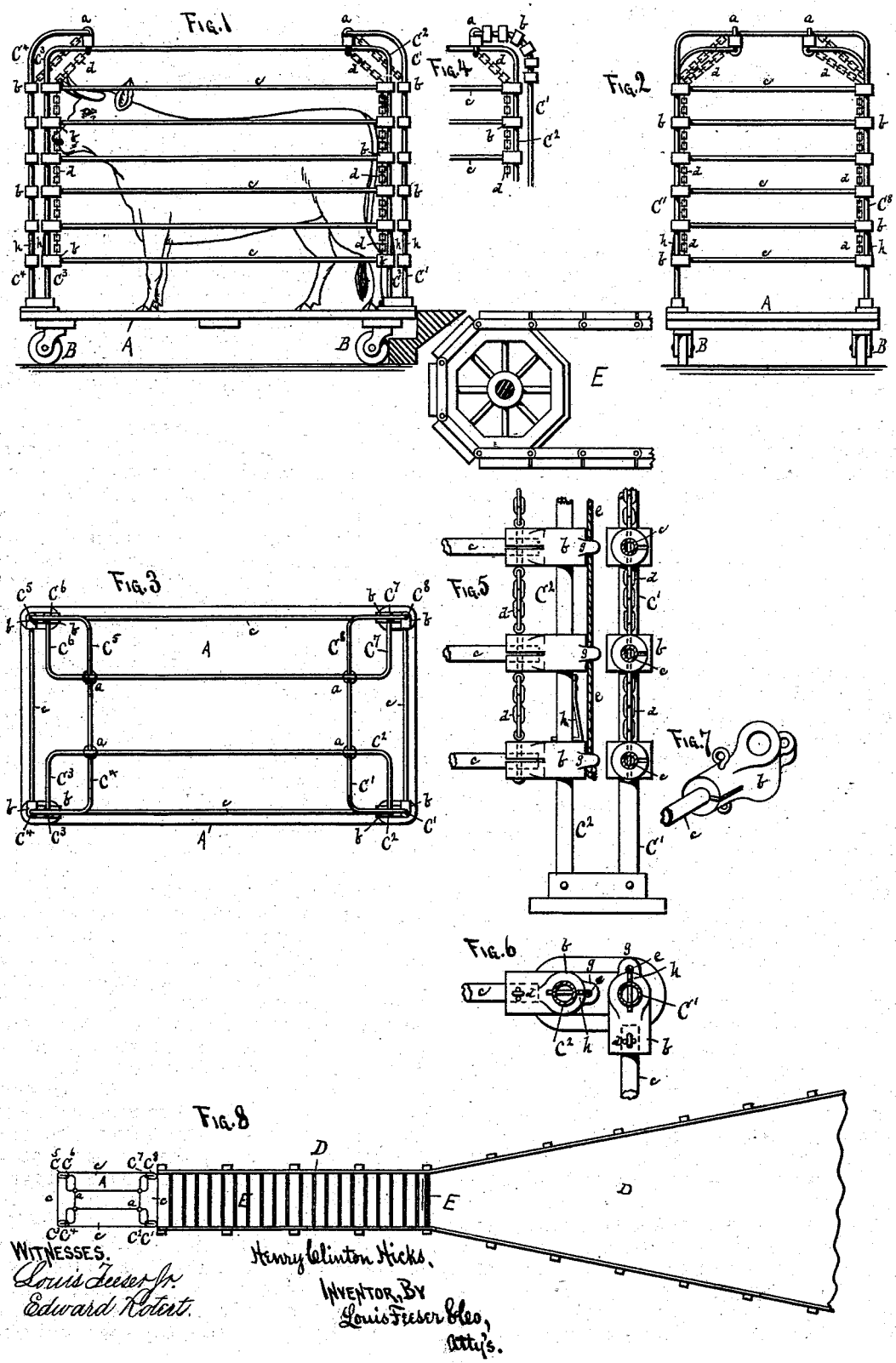

HENRY C. HICKS, OF MINNEAPOLIS, MINNESOTA.

APPARATUS FOR TRANSPORTING ANIMALS.

SPECIFICATION forming part of Letters Patent No. 268,018, dated November 28, 1882.

Application filed March 28, 1882. (No model.)

To all whom it may concern:

Be it known that I, HENRY CLINTON HICKS, a citizen of the United States, and a resident of Minneapolis, in the county of Hennepin and State of Minnesota, have made certain new and useful Improvements in Apparatus for Transporting Animals, of which the following is a specification.

This invention relates to apparatus used in transporting animals from place to place, and in loading them upon cars, boats, &c.; and it consists in the construction and arrangement of parts, as hereinafter described and claimed, and as illustrated by the accompanying drawings, in which—

Figure 1 is a side view of one of the cages or pens and a portion of the traveling runway. Fig. 2 is an end view, and Fig. 3 is a plan view, of the cage or pen. Fig. 4 is a detached view of a portion of one of the upper corners of the cage, illustrating the manner of elevating the sides or ends. Figs. 5, 6, and 7 are enlarged detached detail views of a portion of the cage, illustrating the manner of constructing it. Fig. 8 is a reduced plan view of a cage and the traveling runway.

In transporting animals, either by railroad or boat or otherwise, much difficulty is experienced in loading and unloading them, often resulting in injury and loss. This is especially true in handling wild cattle; and to enable all kinds of animals, but more particularly cattle, to be easily and quickly loaded and unloaded from cars, boats, &c., without injury or danger to those having them in charge is the object of my invention, which consists in a cage or pen mounted upon wheels or casters, and with its sides and ends adapted to be raised upward to permit free ingress or egress from all sides, or be securely held while the cage is moved from place to place, and also in forming the floor of the runway leading to the cage of an endless traveling slotted belt, by which means the animals may be carried along without injury or force.

The cage may be constructed in many ways; but I have shown it formed of a platform, A, mounted upon wheels or casters B, by which it may be easily run from place to place, and with upright standards or posts $C'$ $C^2$ $C^3$ $C^4$ $C^5$ $C^6$ $C^7$ $C^8$, secured in the corners of the platform, and rising upward and bent over and secured to each other by clamps $a$, as shown. At equal distances apart around each of the corner standards collars $b$ are placed and provided with projecting lugs on their sides, in which the ends of rods $c$ are secured, the collars on the standards $C'$ $C^8$ being connected by the opposite ends of the same rods $c$, and the standards $C^2$ $C^3$ and $C^4$ $C^5$ and $C^6$ $C^7$ being similarly connected by their respective collars and rods, the standards $C'$ $C^8$ and $C^4$ $C^5$ forming, with their attached collars and rods, the ends of the cage, while the remaining standards and their collars and rods form the sides of the cage. The collars $b$ of each standard are connected to each other by chains $d$, so that they will retain the same relative distance apart when lowered down, and each set of collars upon each standard will be provided with a rope, $e$, passing up through loops $g$ upon the collars, (see Figs. 5, 6, and 7,) so that by drawing upward upon these cords the lowermost set of collars will be raised until they strike the next set above them, and then these two sets raised until the third is reached, and so on until the whole side or end is drawn up, as shown in Fig. 4. By this means any one or all of the sides or ends of the cage may be raised up to leave the animals free ingress or egress from any side or end, and without removing any part or increasing the size of the cage. In loading cattle upon cars or boats a narrow converging runway, D, is usually employed, as shown in Fig. 8, ending at the car door or boat gangway; but sulky or unruly animals frequently refuse to move along this runway and require forcing and pulling—often to their injury; and to avoid the necessity for this treatment I form the floor of all or a portion of this runway of an endless traveling slatted belt, E, so that the animals will be carried along in spite of themselves without inflicting pain or injuring them in any manner, and with the exertion of only force enough to revolve the shafts at the ends of the belt. One of the cages, with its rear end opened, will be set in front of this runway D, and when an animal is run in the end will be closed down, the cage removed and an empty one set in its place, and so on. The full cages are then run into the car or on board the boat, and when in the place the animal is to occupy the side or end is raised and he allowed to escape.

By providing a number of the cages one may be emptied while another is being filled, so that no time need be lost.

If found practicable, vicious or wild animals may be charged with electricity while in the runway, sufficient to render them tranquil, but not enough to inflict pain or injure them.

When used in connection with stock-cars in which the animals are supported by slings or harness or separated into stalls by partitions, as in my Patent No. 240,250, April 19, 1880, the slings or harness may be placed upon the animals while still in the cages, and the side opened and the animal safely and easily transferred from the cage to the car.

In loading into boats the cages may be made strong enough to be hoisted up bodily with their contents and lowered into the hold and the animals run into stalls, as in cars. They may also be used to advantage in transporting valuable horses or cattle by providing a cage for each animal and leaving them in them during the trip. They may be used in transporting cattle across cities from stock-yards to slaughter-houses, or in zoological gardens or menageries.

Small spring or other catches $h$ will be arranged upon the lower parts of the standards, to catch the lowermost collars $b$ when they are lowered down and hold them from accidental displacement, and to form automatic locks to hold the sides down. One great advantage of this construction is that the raising and lowering of the sides and ends does not increase the size of the cage.

The standards for the corners and the rods $c$ will usually be made of gas-pipe, which combines great strength with lightness.

What I claim as new is—

1. A frame or cage mounted upon wheels, and composed of upright supports, in combination with transverse side and end bars connected to brackets or blocks vertically adjustable on the upright supports, and mechanism for raising and lowering the bars, substantially as and for the purposes set forth.

2. A frame or cage for transporting animals, composed of upright supports and vertically adjustable side and end pieces or bars, in combination with a removable runway having a traveling floor for carrying animals into the cage through its side or end, substantially as set forth.

3. A platform, A, standards $C'$ $C^2$ $C^3$ $C^4$ $C^5$ $C^6$ $C^7$ $C^8$, collars $b$, rods $c$, and chains and cords $d$ $e$, substantially as set forth.

In testimony whereof I have hereunto set my hand in the presence of two subscribing witnesses.

HENRY CLINTON HICKS.

Witnesses:
C. N. WOODWARD,
LOUIS FEESER, Sr.